US009585056B2

(12) United States Patent
Suttmann et al.

(10) Patent No.: US 9,585,056 B2
(45) Date of Patent: Feb. 28, 2017

(54) METHOD AND APPARATUS FOR ROUTING TRAFFIC WITHIN A COMMUNICATION SYSTEM

(71) Applicant: MOTOROLA SOLUTIONS, INC, Schaumburg, IL (US)

(72) Inventors: Karen M Suttmann, Lake Zurich, IL (US); Randy L Ekl, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 302 days.

(21) Appl. No.: 14/535,777

(22) Filed: Nov. 7, 2014

(65) Prior Publication Data

US 2016/0135078 A1    May 12, 2016

(51) Int. Cl.
| | |
|---|---|
| H04W 48/20 | (2009.01) |
| H04W 16/20 | (2009.01) |
| G01C 21/00 | (2006.01) |
| H04W 28/02 | (2009.01) |
| H04W 4/02 | (2009.01) |
| H04W 64/00 | (2009.01) |
| H04W 28/08 | (2009.01) |
| H04W 4/22 | (2009.01) |
| H04W 40/02 | (2009.01) |
| H04W 40/20 | (2009.01) |
| H04W 40/24 | (2009.01) |
| H04W 40/34 | (2009.01) |
| H04L 12/803 | (2013.01) |
| H04W 88/08 | (2009.01) |

(52) U.S. Cl.
CPC ........ *H04W 28/0289* (2013.01); *H04L 47/122* (2013.01); *H04W 4/02* (2013.01); *H04W 4/22* (2013.01); *H04W 28/0226* (2013.01); *H04W 28/08* (2013.01); *H04W 40/02* (2013.01); *H04W 40/20* (2013.01); *H04W 40/248* (2013.01); *H04W 40/34* (2013.01); *H04W 48/20* (2013.01); *H04W 64/003* (2013.01); *H04W 88/08* (2013.01)

(58) Field of Classification Search
CPC ...... H04W 48/20; H04W 16/20; H03J 1/0066; G01C 21/3415; G01C 21/00; B61L 15/0027; G08G 1/0112; G08G 1/0104; G08G 1/20; G08G 5/025
See application file for complete search history.

(56) References Cited

U.S. PATENT DOCUMENTS

| | | | |
|---|---|---|---|
| 7,750,800 B2 | 7/2010 | Wu | |
| 7,979,198 B1 | 7/2011 | Kim et al. | |
| 8,428,794 B2 * | 4/2013 | Peterson | .............. G08G 5/0078 244/76 R |
| 8,700,234 B2 * | 4/2014 | Shafaat | .................. G01C 21/00 701/14 |

(Continued)

FOREIGN PATENT DOCUMENTS

WO        0245046 A2    6/2002

*Primary Examiner* — Yuri Kan

(57) ABSTRACT

A method and apparatus for routing traffic around geographic location (such as an incident scene) is provided herein. During operation, base station RF load levels will be obtained. Any vehicle not part of the incident will be geographic routed around overloaded base stations. Because vehicles will be geographic routed around overloaded base stations, the overloaded base stations will not have to handle the additional RF load from the appropriately-geographic routed vehicles.

15 Claims, 4 Drawing Sheets

(56) References Cited

U.S. PATENT DOCUMENTS

| | | | |
|---|---|---|---|
| 8,914,167 B2* | 12/2014 | Smith | B61L 15/0027 |
| | | | 455/434 |
| 2001/0001847 A1* | 5/2001 | Hessing | G01C 21/3415 |
| | | | 701/421 |
| 2003/0014181 A1* | 1/2003 | Myr | G08G 1/20 |
| | | | 701/117 |
| 2005/0099321 A1 | 5/2005 | Pearce | |
| 2005/0227696 A1* | 10/2005 | Kaplan | G08G 1/0104 |
| | | | 455/440 |
| 2006/0121868 A1* | 6/2006 | Jutori | H03J 1/0066 |
| | | | 455/238.1 |
| 2008/0085679 A1 | 4/2008 | Fettig et al. | |
| 2010/0138096 A1 | 6/2010 | Hung et al. | |
| 2012/0169515 A1* | 7/2012 | Li | G08G 1/0112 |
| | | | 340/907 |
| 2013/0039542 A1 | 2/2013 | Guzik | |
| 2015/0025717 A1* | 1/2015 | Smith | B61L 15/0027 |
| | | | 701/19 |
| 2015/0312774 A1* | 10/2015 | Lau | H04W 16/20 |
| | | | 455/446 |

\* cited by examiner

METHOD AND APPARATUS FOR ROUTING TRAFFIC WITHIN A COMMUNICATION SYSTEM

FIELD OF THE INVENTION

The present invention generally relates to routing vehicular or foot traffic, and more particularly to a method and apparatus for routing such traffic within a communication system.

BACKGROUND OF THE INVENTION

Oftentimes a public-safety incident will over tax any communications network handling the incident. For example, due to a large number of public-safety vehicles and personnel at, for example, a large fire, the base station(s) handling wireless communications may be overloaded. It would be beneficial to reduce radio frequency (RF) load at an over-taxed base station.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to reduce the RF load at an over-taxed base station, a method and apparatus for routing traffic around a geographic location (e.g., an incident scene) is provided herein. During operation, base station RF load levels will be obtained. Any vehicle not part of the incident will be geographic routed around overloaded base stations. Because vehicles will be geographic routed around overloaded base stations, the overloaded base stations will not have to handle the additional RF load from the appropriately-geographic routed vehicles.

Figure 1:
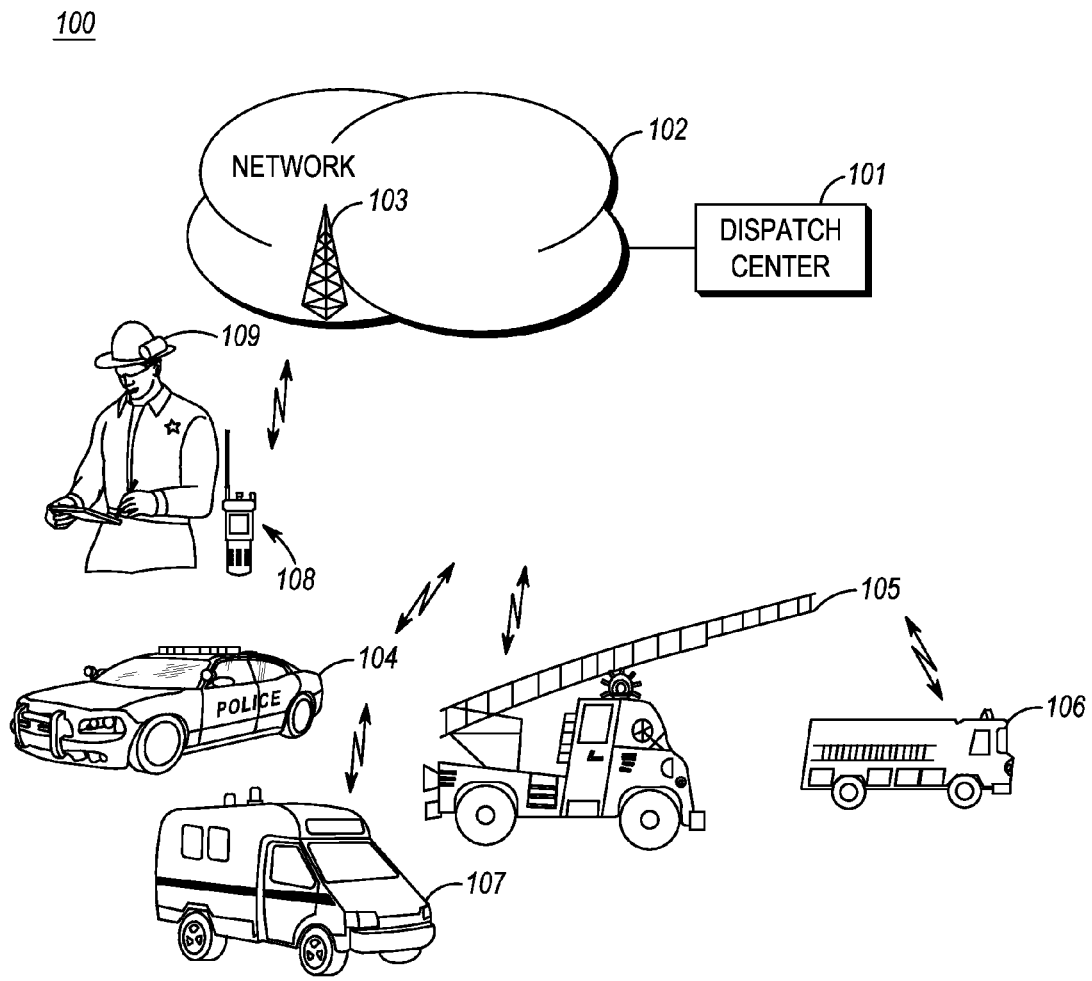
FIG. 1 illustrates a general operational environment at an incident scene.

Turning now to the drawings wherein like numerals designate like components, FIG. 1 is a block diagram showing a general operational environment of communication system 100, according to one embodiment of the present invention. As shown in FIG. 1 a plurality of public-safety vehicles 104-107 and devices 108 are in communication with dispatch center 101 (serving as vehicle geographic router 101) through base station 103 and intervening network 102.

Public-safety vehicles 104-107 may comprise such vehicles as rescue vehicles, ladder trucks, ambulances, police cars, fire engines, . . . , etc. While devices 108 (only one shown) can be any portable electronic device including but not limited to a standalone display or monitor, a handheld computer, a tablet computer, a mobile phone, a police radio, a media player, a personal digital assistant (PDA), a GPS receiver, or the like, including a combination of two or more of these items.

Network 102 may comprise one of any number of over-the-air or wired networks. For example network 102 may comprise a private 802.11 network set up by a building operator, a next-generation cellular communications network operated by a cellular service provider, or any public-safety network such as an APCO 25 network. Network 102 usually comprises several base stations 103 (only one shown). Base stations 103 can receive information (either control or media, e.g., data, voice (audio), video, etc.) in a signal from vehicles 104-107 and devices 108. Base stations 103 can also transmit information in signals to one or more vehicles 104-107 and devices 108.

In this particular illustration the functionality of the vehicle geographic router is placed within dispatch center 101, although in alternate embodiments of the present invention this functionality may be located as stand-alone equipment, or alternatively in any network entity. Additionally, although only four public-safety vehicles 104-107 are shown, one of ordinary skill in the art will recognize that any number of vehicles may be geographic routed to a particular incident. Similarly, although only one device 108 is shown in FIG. 1, one of ordinary skill in the art will recognize that many more devices may exist at any particular incident scene.

As discussed above, oftentimes a public-safety incident will over tax any network handling the incident. For example, due to a large number of public-safety vehicles and personnel at, for example, a large fire, base station 103 handling the wireless communications may be overloaded. In order to address this issue, any vehicle not part of the incident will be preferably geographic routed around overloaded base stations. This is illustrated in FIG. 2.

Figure 2:
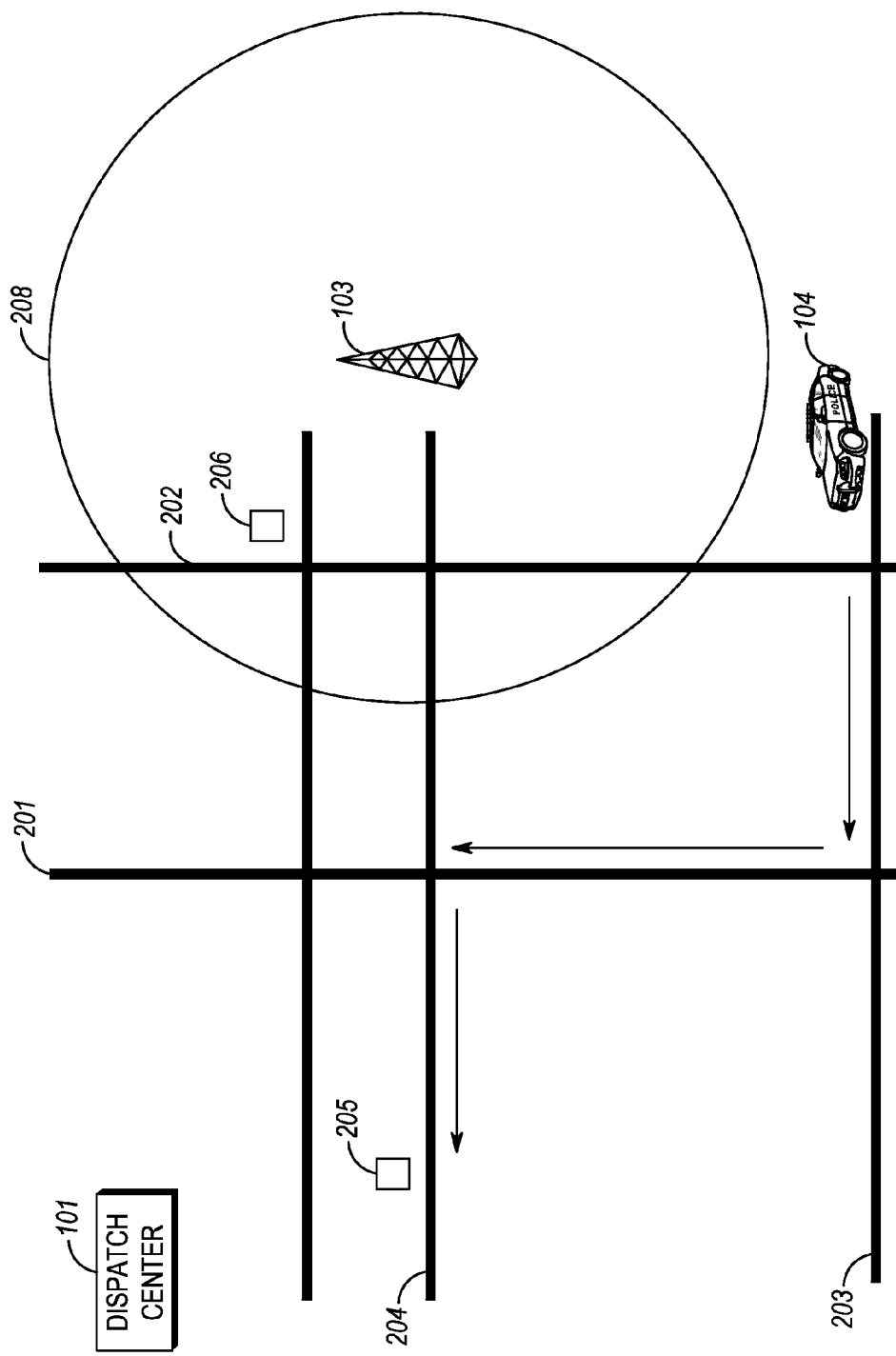
FIG. 2 illustrates a simplified map used to aide in understanding the operation of the present invention.

FIG. 2 illustrates a simplified map used to aide in understanding the operation of the present invention. With reference to FIG. 2, assume that base station 103 has become loaded above a predetermined threshold (e.g., 85% of capacity) due to an incident within building 206. Also, assume that vehicle 104 needs to be dispatched to building 205. A geographic route that takes vehicle 104 down road 202 to road 204 would require vehicle 104 to pass through coverage area 208 of base station 103. This would add to the RF load of base station 103. Because of this, dispatch center 101 will geographic route vehicle 104 to building 205 using roads 203, 201, and 204. Therefore, vehicle 104 will not pass through coverage area 208 and not add to the RF load of base station 103.

It should be noted that while outside coverage area 208, vehicle 104 will preferably remain in communication with other base stations (not shown in FIG. 2). Additionally, the routing of vehicle 104 will preferably take place by dispatch center 101 providing the geographic route to vehicle 104 via over-the-air communication using network 102. Vehicle 104 may be "unaware" of any RF load issues with base station 103.

Figure 3:
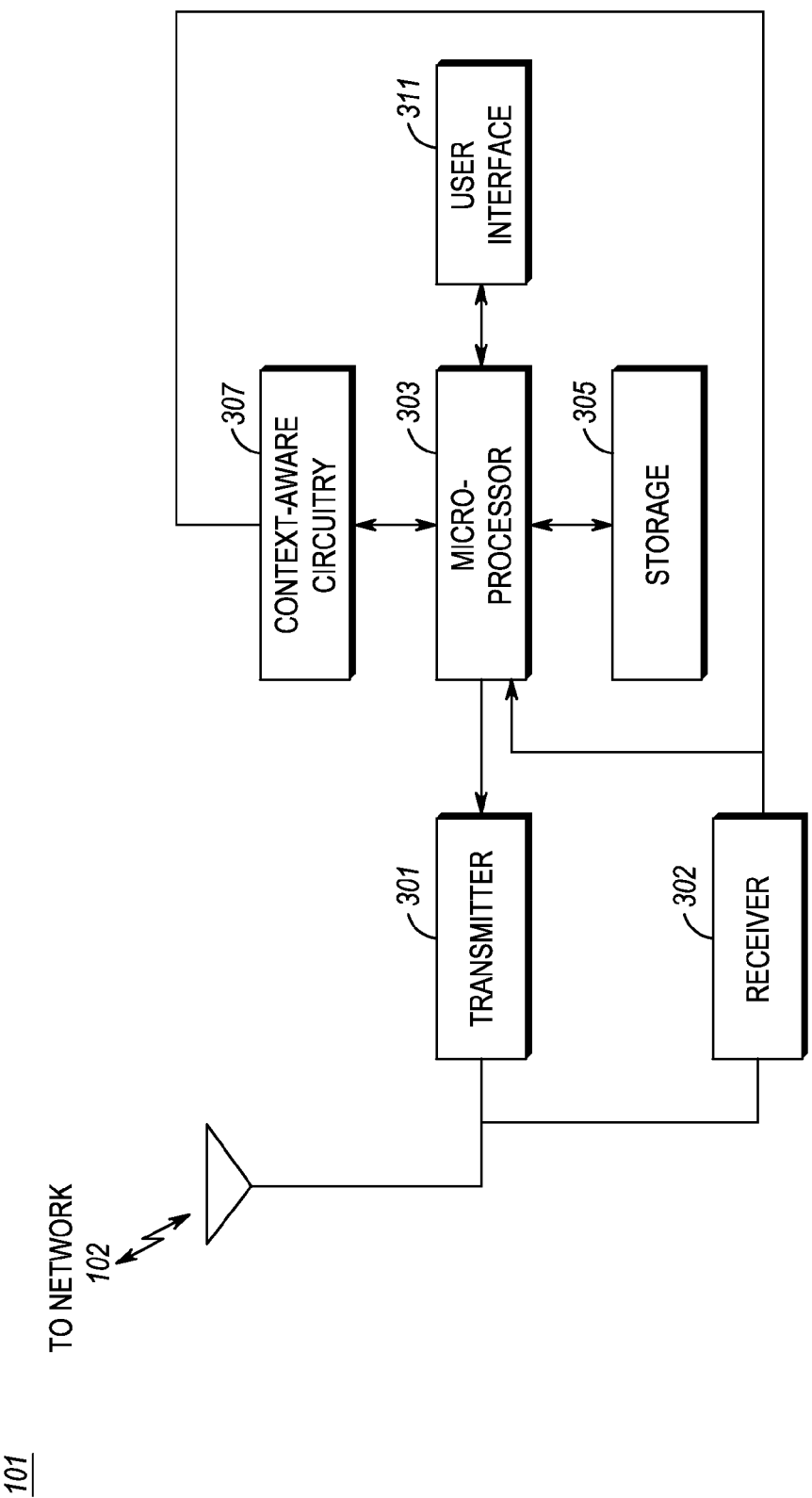
FIG. 3 is a block diagram of the dispatch center of FIG. 1.

FIG. 3 is a block diagram of dispatch center 101. Dispatch center 101 typically comprises processor 303 (sometimes referred to as a microprocessor, logic unit, or logic circuitry) that is communicatively coupled with various system components, including transmitter 301, receiver 302, general storage component (database) 305, context-aware circuitry 307, and user interface (GUI) 311. Only a limited number of system elements are shown for ease of illustration; but additional such elements may be included in the dispatch center 101.

Processing device 303 may be partially implemented in hardware and, thereby, programmed with software or firmware logic or code for performing functionality described herein; and/or the processing device 303 may be completely implemented in hardware, for example, as a state machine or ASIC (application specific integrated circuit). Storage 305 can include short-term and/or long-term storage of various information needed for the recall of specific knowledge to aide in routing vehicles. For example, storage 305 may comprise maps along with vehicle locations, current locations of incidents, base station loading levels, etc. Storage 305 may further store software or firmware for programming the processing device 303 with the logic or code needed to perform its functionality.

User interface 311 receives an input from a user that may be used to geographic route vehicles accordingly. For example, user interface 311 provides a way of inputting a type of emergency event along with an address of the emergency event. In an embodiment, event information may be displayed to the user of dispatch center 101 along with vehicles dispatched. In order to provide the above features (and additional features), user interface 311 may include a keypad, a display/monitor, a mouse/pointing means, and/or various other hardware components to provide a man/machine interface.

Context-aware circuitry 307 preferably comprises circuitry that determines traffic conditions. For example, context-aware circuitry 307 may comprise a receiver that receives current traffic conditions from a subscribed service, for example, Google™ Maps. Circuitry 307 also receives base station coverage areas along with an associated base station RF load level. The coverage areas and RF load levels may be retrieved from storage 305 or received in real time via receiver 302, or a combination of both. Logic circuitry 303 will use information generated by circuitry 307 and retrieved from storage 305 to determine appropriate geographic routes for any person or vehicle.

Transmitter 301 and receiver 302 are common circuitry known in the art for communication utilizing a well known communication protocol, and serve as means for transmitting and receiving messages. For example, receiver 302 and transmitter 301 may be well known long-range transceivers that utilize the Apco 25 (Project 25) communication system protocol. Other possible transmitters and receivers include, IEEE 802.11 communication system protocol, transceivers utilizing Bluetooth, HyperLAN protocols, or any other communication system protocol.

In a preferred embodiment processor 303 receives a notification that a vehicle needs to be geographic routed to a particular location/destination. (Note that the notification may be part of an automated process and need not be input to logic circuitry 303 via user interface 311). The vehicle's location is determined. This determination may be made by processor 303 receiving an updated location from the vehicle through receiver 302.

Once the location/destination and the current vehicle location are known, processor 303 determines an appropriate geographic route for the vehicle. More particularly, a map is obtained from storage 305 along with RF load levels for base stations within network 102. Context-aware circuitry 307 is utilized to determine any traffic condition that may exist. A geographic route is chosen that bypasses coverage areas of base stations having a RF load level above a predetermined threshold.

It should be noted that in some situations an adequate geographic route may not exist that avoids an overloaded base station. For example an overloaded base station may exist along the only road to a vehicle's destination, or a geographic route which avoids an overloaded base station will add an unacceptable amount of time to the trip. In these situations the vehicle may need to be geographic routed so that it passes through the coverage area of an overloaded base station.

Calculation of Geographic Routes:

Geographic routes will be calculated for each responding person/vehicle within a single or distributed networked server. As an example, the server functionality is included within dispatch center 101. Once a vehicle or person needs to be dispatched to a particular area, the following information will be obtained by dispatch center 101:

A destination: This information may be automatically obtained via a 911 computer-aided dispatch system, or provided to processor 303 via user interface 311. The destination may be a location of a public-safety incident, or alternatively may simply be a location where a patrol is desired.

A current location of person or vehicle to be dispatched: Receiver 302 will periodically receive the locations for all persons or vehicles that may be dispatched. This information is normally obtained via standard messaging between devices/vehicles and dispatch center 101. This information may be stored in storage 305 until it is again periodically updated.

Traffic conditions for all possible geographic routes to the destination from the current location. In order to aide in determining a more-efficient geographic route, it may be necessary to determine traffic conditions so that heavily-congested geographic routes may be avoided. This is accomplished ideally via context-aware circuitry receiving this information from a subscribed source, such as Google Maps®.

Coverage areas for each base station within the network: Because this information rarely changes, this information is preferably pre-populated within storage 305.

Current RF load for each base station within the network: This information may be transmitted wirelessly by each base station, or may be backhauled to the dispatch center from each base station. Regardless of how this information is received, the information is received and stored in storage 305.

With the above information known, processor 303 can calculate an appropriate geographic route. In particular for each path from the person/vehicle to the location/destination, the calculations will take into account the traffic conditions (e.g., congestion) and current RF load for the base station(s) the person/vehicle will pass through. An estimate of travel time for each geographic route is determined. A path is determined that directs the person/vehicle through a lower-utilized coverage area while still maintaining adequate travel times. A travel time may be considered adequate if it is within a certain percentage of the shortest calculated travel time. For example, assume that the shortest travel time takes a vehicle through an overloaded base station's coverage area. There may exist an alternate geographic route that only adds 5% onto the time of the trip. This may be acceptable. So processor 303 may determine a geographic route as adequate if it is a geographic route with the shortest travel time and it misses a coverage area of an overloaded base station. If the geographic route with the shortest travel time passes through the coverage area of an overloaded base station, it may still be acceptable if it results in a travel time that is within a certain percentage (e.g., 5%) of the shortest travel time, or does not add appreciable travel time to the trip (e.g., less than 1 minute).

Figure 4:
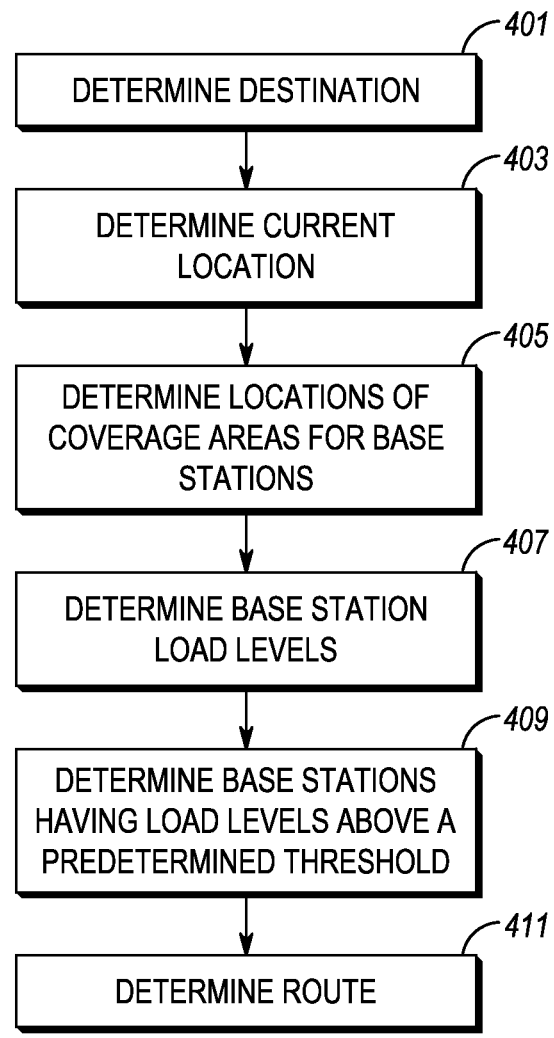
FIG. 4 is a flow chart showing operation of the dispatch center of FIG. 3.

FIG. 4 is a flow chart showing operation of dispatch center 101. The logic flow begins at step 401 where logic circuitry 303 determines a destination for a person or vehicle. As discussed above, the destination may comprise a scene of an incident (i.e., a crime) that was reported to dispatch center 101. At step 403 logic circuitry determines a current location of the person or vehicle. The current location is preferably periodically reported to dispatch center 101 by the person's device 108 or vehicle as part of normal operation of communication system 100.

At step 405 logic circuitry 303 accesses database 305 to determine locations of coverage areas for base stations. As one of ordinary skill in the art will recognize, a coverage area for a particular base station comprises an area where any communications from a device will utilize resources from the base station. Therefore, a device or vehicle is said to be within the coverage area of a particular base station if the device or vehicle is capable of using uplink and downlink resources from the particular base station.

At step 407 logic circuitry 303 accesses database 305 to determine a RF load levels for base stations. These RF load levels preferably comprise a percentage of total capacity for uplink and downlink transmissions. For example, a particular base station may be at 70% capacity for uplink and/or downlink transmissions.

At step 409 logic circuitry 303 determines those base stations having RF load levels above a predetermined threshold (e.g. 80%) and at step 411 determines a geographic route based on the current location, the destination, the coverage areas, and the RF load levels, the geographic route existing between the current location and the destination and avoids coverage areas of base stations having RF load levels above a predetermined threshold.

Although not shown in FIG. 4, an optional step may exist of having logic circuitry 303 access context aware circuitry 307 to determine traffic conditions for possible geographic routes between the current location and the destination. If this optional step is executed, then the step of determining the geographic route comprises the step of determining a geographic route with a shortest travel time and that avoids coverage areas of base stations having RF load levels above a predetermined threshold, the geographic route additionally based on traffic conditions.

As discussed above the step of determining the geographic route preferably comprises determining the geographic route that has a travel time within a certain percentage of the shortest geographic route, when the shortest geographic route passes through an over-taxed base station. Additionally, the step of determining the RF load levels comprises the step of determining how much transmission and/or reception capacity currently being utilized. Finally, although not shown in FIG. 4, transmitter 301 may be utilized transmit the determined geographic route to the person or vehicle.

In the foregoing specification, specific embodiments have been described. However, one of ordinary skill in the art appreciates that various modifications and changes can be made without departing from the scope of the invention as set forth in the claims below. For example, although the above examples were given with a vehicle being geographic routed accordingly, in alternate embodiments of the present invention a person may be geographic routed in a similar fashion. It should also be noted that a load level at a base station may encompass a load level at any RF site (e.g., a sector of a base station). Load levels can also encompass a number of channels in use, so for example, at a 10-channel site, if 9 channels are in use, then a single channel is available for use, and the load will be 90%. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for calculating a route for routing traffic within a communication system, the method comprises steps of:
   determining a destination for a person or vehicle;
   determining a current location of the person or vehicle;
   determining locations of coverage areas for base stations;
   determining a load levels for base stations;
   determining those base stations having load levels above a predetermined threshold; and
   determining a route based on the current location, the destination, the coverage areas, and the load levels, the route existing between the current location and the destination and avoids coverage areas of base stations having load levels above a predetermined threshold.

2. The method of claim 1 further comprising steps of:
   determining traffic conditions for possible routes between the current location and the destination; and
   wherein the step of determining the route comprises determining a route with a shortest travel time and that avoids coverage areas of base stations having load levels above a predetermined threshold, the route additionally based on traffic conditions.

3. The method of claim 1 wherein the step of determining the route comprises determining a route that has a travel time within a certain percentage of a shortest route.

4. The method of claim 1 wherein the step of determining the load levels comprises determining how much transmission and/or reception capacity currently being utilized.

5. The method of claim 1 wherein the step of determining the destination comprises determining a location of a public-safety incident.

6. The method of claim 1 wherein the step of determining coverage areas for a particular base station comprises determining an area where any communications from a device will utilize resources from the base station.

7. The method of claim 1 further comprising:
   transmitting the determined route to the person or vehicle.

8. An apparatus comprising:
   a database comprising a map containing locations of coverage areas for base stations; and
   logic circuitry determining a destination for a person or vehicle, determining a current location of the person or vehicle, accessing the database to determine locations of coverage areas for base stations, determining a load levels for base stations, determining those base stations having the load levels above a predetermined threshold, and determining a route based on the current location, the destination, the coverage areas, and the load levels, the route existing between the current location and the destination and avoids coverage areas of base stations having load levels above a the predetermined threshold.

9. The apparatus of claim 8 further comprising:
   the logic circuitry determining traffic conditions for possible routes between the current location and the destination; and
   wherein the logic circuitry determines the route by determining a route with a shortest travel time and that avoids coverage areas of base stations having load levels above a predetermined threshold, the route additionally based on traffic conditions.

10. The apparatus of claim 8 wherein the logic circuitry determines the route by determining a route that has a travel time within a certain percentage of a shortest route.

11. The apparatus of claim 8 wherein the logic circuitry determines the load levels comprises determining how much transmission and/or reception capacity currently being utilized.

12. The apparatus of claim 8 wherein the logic circuitry determines the destination by determining a location of a public-safety incident.

13. The apparatus of claim 8 wherein the logic circuitry determines coverage areas for a particular base station by determining an area where any communications from a device will utilize resources from the base station.

14. The apparatus of claim 9 further comprising:
    a transmitter transmitting the determined route to the vehicle or person.

15. A method for calculating a route for routing traffic within a communication system, the method comprises steps of:
- determining a destination for a person or vehicle;
- determining a current location of the person or vehicle;
- determining locations of coverage areas for base stations;
- determining a load levels for base stations;
- determining traffic conditions for possible routes between the current location and the destination;
- determining those base stations having load levels above a predetermined threshold;
- determining a route based on the current location, the traffic conditions; the destination, the coverage areas, and the load levels, the route existing between the current location and the destination and avoids coverage areas of base stations having load levels above a predetermined threshold;
- wherein the step of determining the route comprises determining a route that has a travel time within a certain percentage of a shortest route;
- wherein the step of determining the load levels comprises determining how much transmission and/or reception capacity currently being utilized;
- the step of determining the destination comprises determining a location of a public-safety incident;
- wherein the step of determining coverage areas for a particular base station comprises determining an area where any communications from a device will utilize resources from the base station; and
- transmitting the determined route to the person or vehicle.

* * * * *